यूनाइटेड स्टेट्स पेटेंट

United States Patent [19]
Bowman

[11] 3,963,048
[45] June 15, 1976

[54] POPPET VALVE ASSEMBLY
[75] Inventor: Larry L. Bowman, Kalamazoo County, Mich.
[73] Assignee: General Gas Light Company, Kalamazoo, Mich.
[22] Filed: Feb. 27, 1975
[21] Appl. No.: 553,468

[52] U.S. Cl. .................. 137/596.17; 137/596.1
[51] Int. Cl.² ............................... F15B 13/044
[58] Field of Search ........... 137/595, 596.17, 596.1, 137/596.2, 625.65; 251/282

[56] References Cited
UNITED STATES PATENTS

| | | | |
|---|---|---|---|
| 2,476,519 | 7/1949 | Van der Werff | 137/596.17 |
| 3,251,378 | 5/1966 | Loveless et al. | 137/596.17 |
| 3,557,828 | 1/1971 | Smith | 137/596.1 |

FOREIGN PATENTS OR APPLICATIONS

| | | | |
|---|---|---|---|
| 840,439 | 7/1960 | United Kingdom | 251/282 |
| 898,122 | 6/1962 | United Kingdom | 137/596.2 |

Primary Examiner—Alan Cohan
Assistant Examiner—Gerald A. Michalsky
Attorney, Agent, or Firm—Woodhams, Blanchard and Flynn

[57] ABSTRACT

A miniature poppet valve, particularly for the control of a pressurized gas, such as air, constructed and arranged so that it can be made in very small sizes without excessive expense while being reliable, sturdy and resistive to damage. The valve includes a housing having ports to accommodate conventional conduits of rather large size, which ports communicate with a central passage containing therein a slidable valve stem of extremely small size. The valve stem has a resilient seal ring thereon for creating a sealed engagement with a surrounding annular valve seat when the valve stem is shifted axially from an open position into a closed position. The valve stem projects outwardly from opposite ends of the central passage and is sealed with respect to the housing by seal rings disposed adjacent opposite ends of the passage to prevent the pressurized gas from acting against the ends of the valve stem and imposing an unbalanced force thereon. One of the extending ends of the stem is connected to an operator, such as a solenoid.

4 Claims, 7 Drawing Figures

POPPET VALVE ASSEMBLY

FIELD OF THE INVENTION

This invention relates to an improved poppet valve for controlling the flow of a pressurized gas, usually air, and particularly a valve which is internally balanced and is adapted for manufacture in very small sizes without sacrificing reliability, simplicity or economy of manufacture and maintenance.

BACKGROUND OF THE INVENTION

In general, the art involving electrically operated valves for handling pressurized gases is highly developed and a large number of designs have been known for many years and have long been in successful operation. Many competing designs are available in the marketplace and such designs have been successfully modified for application to a wide variety of specific uses. This art has, however, developed primarily in connection with relatively large valves, such as valves adapted for connection to conduits of at least about ¼ inch internal diameter (⅛ NPT pipe) and arranged for supplying, for example, air cylinders of one inch in diameter and having a stroke of up to 8 inches.

However, in addition to the foregoing, there has over the past several years been developing a series of applications for electrically operated valves for controlling a pressurized gas, which vales are extremely small.

In some instances such small valves are intended for controlling correspondingly small pressure responsive cylinders and in other cases such small valves are to be provided insofar as possible with the flow characteristics of larger valves and intended for controlling pressure responsive cylinders of the sizes above mentioned. These last named valves present a wholly different series of problems in that the concepts and resulting designs developed with respect to large valves become wholly inappropriate when applied to small valves. These problems develop at several points, partly with respect to tolerances, partly with respect to access for machine operations and partly with respect to various functional aspects.

Such problems in the design of small valves occur both in the design of control valves as for locating in a control panel for controlling a plurality of working valves on a machine tool or as in the designing of such working valves themselves where it is desirable to reduce their size as much as possible for a variety of purposes including economy of space required and economy of working fluid absorbed by the valve.

Among such problems and particularly a problem which has existed for many years with conventional poppet valves, is the unbalanced force which is imposed on the valve stem by the pressurized gas. In most conventional poppet valves, the valve stem has one end thereof extending outwardly of the housing and connected to an operator, whereas the other end of the valve stem terminates within the valve housing and is exposed to the pressure fluid. In such case, regardless of whether the valve is normally open or normally closed, it has usually been necessary to utilize springs in opposition to the pressure unbalance in order to enable the valve to respond properly to whatever control force is applied thereto. However, when spring pressure is utilized, this presents difficulties in applying a single valve to meet a wide range of pressure situations. Thus, it has often been necessary to change the spring depending upon the pressure of the fluid being utilized, but this itself is undesirable and creates additional manufacturing and maintenance problems. In some prior poppet valves, springs have not been utilized to overcome the pressure unbalance on the valve, but instead the orifice between the valve and the valve seat is designed to accommodate only a limited pressure range so that a valve having a relatively large orifice will be limited to low pressure valves whereas a valve having a small orifice will be capable of handling higher pressures. Needless to say, valve structures of this type are also undesirable inasmuch as a single valve again is not able to meet a wide range of pressure situations.

These problems become especially severe when applied to the valves of small sizes. In some cases, the space occupied by such balance springs, when same are used, undesirably limits the extent to which the valve size can be reduced. In other cases the forces to be balanced in small valves are difficult to hold within acceptable tolerances for balancing by springs. In those situations where orifice control is utilized as abovementioned, this, for reasons of sizes and tolerances, becomes extremely difficult to apply to small valves and hence is often not feasible.

Accordingly, the objects of the invention include:

1. To provide a poppet valve for controlling the flow of a pressurized gas, which valve will be efficient and reliable and can be economically manufactured in very small sizes.

2. To provide a valve, as aforesaid, which when produced in the very small sizes indicated will still be sturdy and reliable over a long period of time of high speed repetitive operation.

3. To provide a valve, as aforesaid, which in spite of the very small size can be efficiently associated with conduits as normally used for large valves.

4. To provide a valve, as aforesaid, which in spite of the very small size will have performance characteristics as good as or better than those associated with previously known larger valves and can, accordingly, be used effectively as a working valve for supplying pressure fluid cylinders of sizes more normally associated with control by larger valves.

5. To provide a valve, as aforesaid, wherein the fluid pressure is not permitted to impose any substantial unbalance on the valve stem so that a single valve can be made to operate effectively over a wide pressure range.

6. To provide a valve, as aforesaid, wherein the valve stem extends outwardly from the opposite ends of the housing and has a seal ring surrounding same and engaging a valve seat in the manner of a poppet valve, with opposite ends of the valve stem being sealed with respect to the valve housing to prevent pressure fluid from imposing an unbalanced pressure force on the ends of the valve stem.

7. To provide a valve, as aforesaid, in which all fliud lines thereto connect therewith at only one end of said valve whereby to make possible a convenient and neat connection of said valve into a fluid pressure system.

Other objects and purposes of the invention will be apparent upon examination of the accompanying drawings and reading of the following specification.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the valve assembly and designated parts thereof. Said terminology will include the words specifically mentioned, derivatives thereof and words of similar import.

SUMMARY OF THE INVENTION

The present invention relates to a poppet valve assembly wherein a housing has a through opening which communicates with a plurality of flow control ports. The through opening accommodates an elongated valve stem which has the opposite ends thereof disposed in slidable and sealed engagement with the housing. A valve seat is formed on the housing in surrounding relationship to the through opening and is adapted for engagement by a poppet valve formed by a resilient seal ring mounted on the valve stem. One end of the valve stem projects outwardly and is connected to an operator, such as a solenoid.

DETAILED DESCRIPTION

Figure 1:
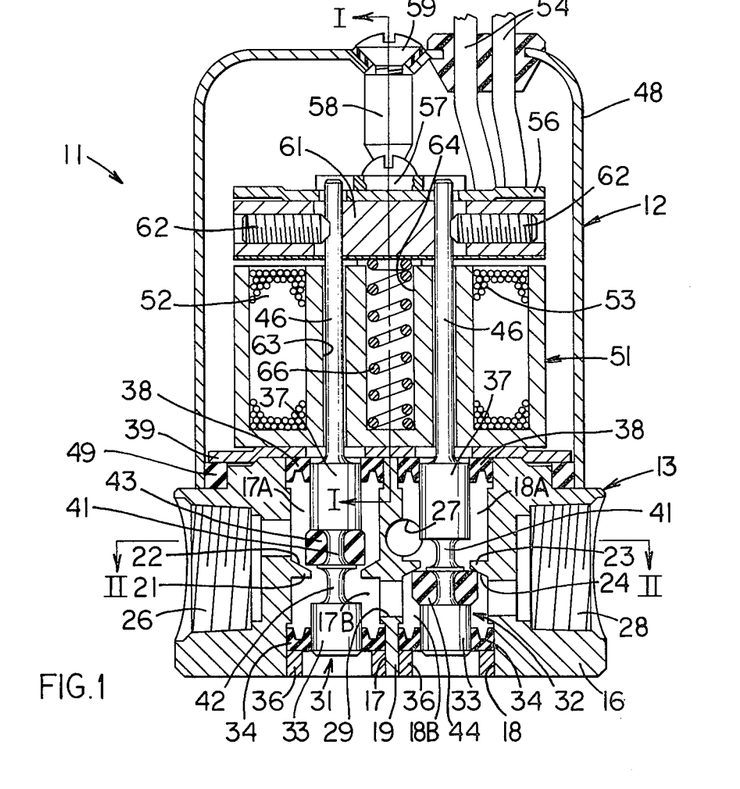
FIG. 1 is a central sectional view of a poppet valve assembly embodying the invention.
Figure 1A:
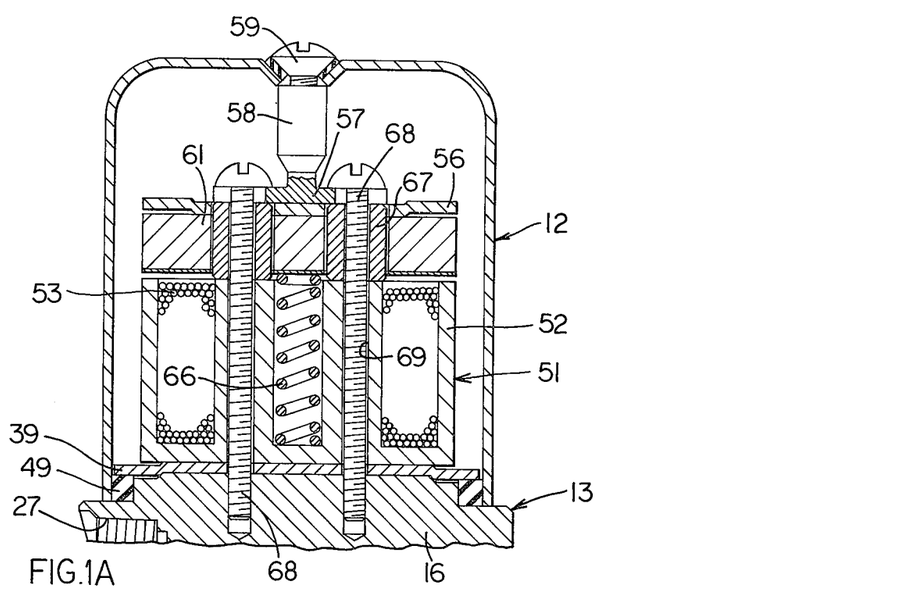
FIG. 1A is a fragmentary sectional view taken along line I—I of FIG. 1.
Figure 2:
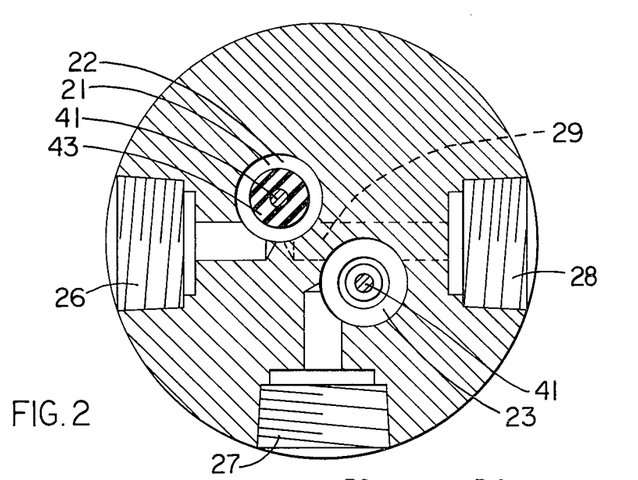
FIG. 2 is a sectional view taken along line II—II in FIG. 1.

Referring to FIGS. 1 and 2, there is illustrated a poppet valve assembly 11 particularly adaptable for construction in very small sizes, such as 1 13/16 inches in diameter and 2 2½ inches long including the solenoid operating portion thereof, which assembly includes an electrical operating portion 12 and a valve portion 13. While the valve and operating portions are made for close cooperation with each other, nevertheless it will be appreciated that the valve portion will itself operate effectively with other operating portions, including mechanical and pneumatic operators.

Considering first the valve portion 13, there is provided a substantially cylindrical housing 16 having a pair of substantially parallel and cylindrical openings 17 and 18 extending therethrough, which openings are separated by an intermediate wall portion 19. A first annular flange 21 is fixedly associated with the housing 16 and projects inwardly into the opening 17 in surrounding relationship thereto and is provided with an upwardly directed tapered surface 22 thereon, which surface 22 functions as a valve seat. In a similar manner, an annular flange 23 is fixed to the housing and projects into the other cylinder opening 18 and has a downwardly facing tapered surface 24 thereon which also functions as a valve seat.

The valve housing 16 has a first radially extending port 26 formed therein which functions as an inlet port and communicates with the opening 17 at a location disposed directly above the valve seat 22. A second port 27 as formed in the housing communicates with the other opening 18 at a location disposed on the opposite side of the flange 23 from the valve seat 24. Port 27 functions as an exhaust port. A third port 28 communicates with the opening 18 at a location disposed closely adjacent and below the valve seat 24, which port 28 functions as a load port. All of the ports 26, 27 and 28 are threaded in a conventional manner and are of a conventional diameter so as to receive therein a standardized conduit, such as a ¼ NPT pipe. The cylindrical openings 17 and 18 also communicate with one another by means of an opening 29 formed in the intermediate wall 19.

Valve stems 31 and 32 are movably positioned within the cylindrical openings 17 and 18, respectively. The valve stems 31 and 32 are identical and each includes a cylindrical guide portion 33 at the lower end thereof slidably supported within and sealingly engaged by a conventional resilient seal ring 34. Each seal ring 34, which creates a sealed relationship between the cylindrical guide portion 33 and the respective opening 17 or 18, is retained within the respective opening by means of a retainer ring 36. Each stem 31 and 32 also has a cylindrical guide portion 37 formed on the upper end thereof and slidably supported within and sealingly engaged by a resilient seal ring 38. Each seal ring 38 is retained within the respective openings 17 or 18 by an annular disk 39 which overlies the upper end of the valve housing 16.

Each valve stem 31 and 32 has a pair of identical annular grooves 41 and 42 formed therein and positioned closely adjacent one another, which grooves axially separate the cylindrical guide portions 33 and 37. An annular elastomeric seal ring 43 is disposed within the upper groove 41 as associated with the valve stem 31 so as to be positioned for sealing engagement with the upwardly facing valve seat 22. A further annular elastomeric seal ring 44 is disposed within the lower groove 42 as associated with the valve stem 32 so as to be positioned for sealing engagement with the downwardly facing valve seat 24. The seal ring 43 and its coaction with the valve seat 22 effectively divides the cylindrical opening 17 into upper and lower chambers 17A and 17B, respectively, which chambers have their upper and lower ends closed by means of seal rings 38 and 34, respectively. In a similar manner, the seal ring 44 in cooperation with the valve seat 24 divides the cylindrical opening 18 into upper and lower chambers 18A and 18B, respectively.

Each of the valve stems 31 and 32 has an elongated rod portion 46 which extends upwardly from the valve portion 13 and coacts with the operating portion 12 for permitting control over the axial movement of the respective valve stems. The connection of these rod portions 46 to the operating portion 12 will be considered hereinbelow.

The operating portion 12 includes a cup-shaped housing 48 which has the lower free edge thereof positioned in engagement with the valve housing 16 by means of an intermediate annular packing 49. The housing 48 encloses an electrical operator 51 which includes an electromagnet 52 formed by a cup-shaped coil holder having a solenoid coil 53 associated therewith and supplied with energy by electrical leads 54.

Spaced upwardly from the electromagnet 52 is a top plate 56, which plate is disposed directly below a support member 57.

The support member 57 is spaced a preselected distance above the electromagnet 52 by a pair of spacer sleeves 67. The electromagnet 52 is fixedly connected to the valve housing 16 by a pair of threaded screws 68 which bear against the support member 57 and extend through the spacers 67 and aligned openings 69 for threaded engagement with the housing 16.

A disklike solenoid armature 61 is positioned in the axial space between electromagnet 52 and plate 56 and has an axial length slightly less than the length of the space so as to permit the plunger 61 to have a limited axial movement. The armature 61 has a pair of openings extending axially therethrough so as to accommodate therein the upper free ends of the rod portions 46, which rod portions 46 are fixedly connected to the armature 61 by means of set screws 62. These rod portions 46 in turn slidably extend through axially extending opening 63 formed in the electromagnet 52.

The electromagnet 52 has a central opening 64 formed therein, which opening opens upwardly and accommodates therein a conventional compression spring 66. The compression spring 66 has the lower end seated in the electromagnet 52 whereas the upper end of the spring bears against the armature 61, whereby armature 61 is urged upwardly against the plate 56, which plate bears against the fixed support member 57. Spring 66 thus maintains the valve stems in the position illustrated in FIG. 1, in which position the seal ring 43 is spaced from the valve seat 22 whereas the seal ring 44 is maintained in sealing engagement with the valve seat 24.

OPERATION

The operation of the poppet valve assembly illustrated in FIGS. 1 and 2 will be briefly described to ensure a complete understanding thereof.

When electrical operator 51 is deenergized, then spring 66 maintains armature 61 in its uppermost position, whereupon poppet valve stems 31 and 32 are maintained in their uppermost open and closed positions, respectively. When the valve assembly is in this open position, pressurized gas will flow through inlet port 26 into chamber 17A, and then past valve seat 22 into chamber 17B, from which pressurized gas flows through opening 29 into chamber 18B. The pressurized gas then flows through load port 28 so as to be supplied to a suitable device, such as a fluid pressure cylinder. Since seal ring 44 is engaged with valve seat 24, the exhaust port 27 is accordingly isolated from both the inlet and load ports. When in this open position, the pressurized gas acting on valve stem 31 is substantially balanced and exerts no substantial biasing effect in either axial direction. With respect to the pressurized gas contained in chamber 18B, same will exert a slight force on the valve stem 32 biasing same upwardly into its closed position due to the seal ring 44 being of larger diameter than the guide portion 33. However, this upward biasing force is of minimal effect.

When the operator 51 is energized, then armature 61 is moved downwardly into engagement with the upper end of electromagnet 52, and valve stems 31 and 32 are also moved downwardly so that seal ring 43 sealingly engages the valve seat 22 while the seal ring 44 is moved out of engagement with the valve seat 24. This isolates the inlet port 26 and the associated chamber 17A from the lower chamber 17B, and also connects the load port 28 and its associated compartment 18B with the compartment 18A and the exhaust port 27 so that pressure fluid can be vented. The valve stem again remains balanced in any operating position thereof due to the continued projection of the guide portions 33 and 37 past their respectively associated seals 34 and 38. This reduces the power required to be applied thereto for effecting operation of the valve in any position and hence reduces the size of solenoid required and in turn reduces both the power demand and total physical size of the valve.

MODIFICATIONS

Figure 3:
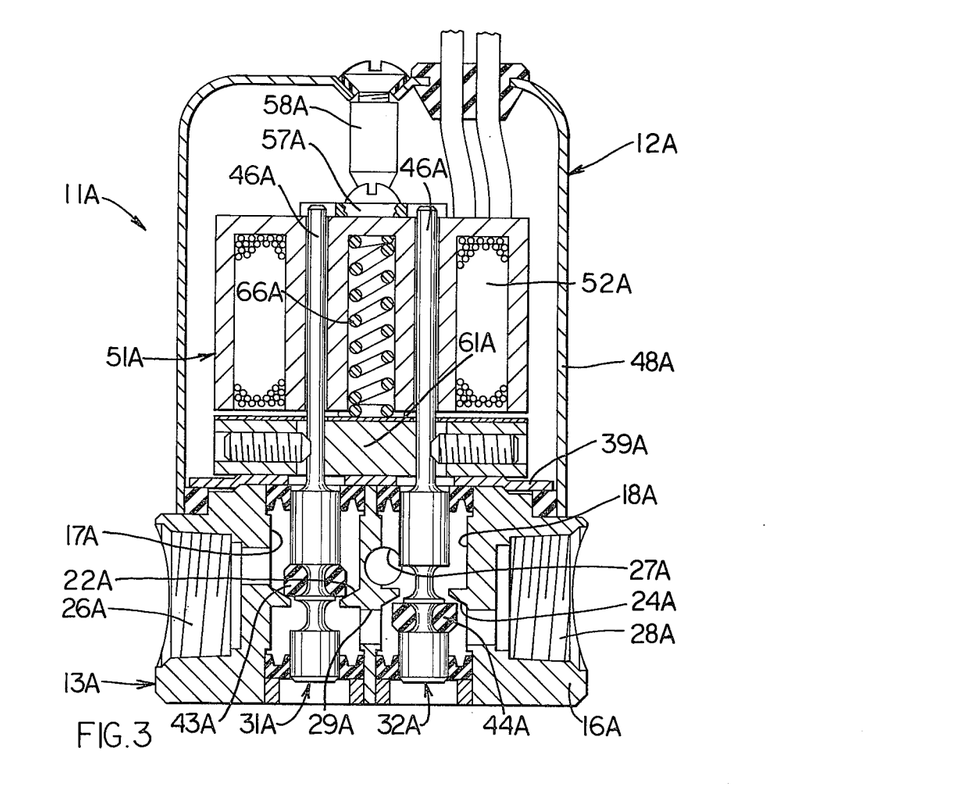
FIG. 3 is a sectional view similar to FIG. 1 and illustrating a modified poppet valve assembly.

FIG. 3 illustrates a modified valve assembly 11A which is substantially similiar to the valve assembly of FIGS. 1 and 2, except that FIG. 3 relates to a normally closed valve assembly whereas FIGS. 1 and 2 relate to a normally open valve assembly. Accordingly, the same numerals used in FIGS. 1 and 2 likewise designate the corresponding parts in FIG. 3 but with the addition of an "A" thereto.

As illustrated in FIG. 3, the electromagnet 52A is fixedly connected to valve housing 16A by means of screws 68A. The solenoid armature 61A is disposed between the electromagnet 52A and the lower disk 39A, which armature 61A is normally urged downwardly against the disk 39A by the spring 66A. The poppet valve stems 31A and 32A are thus normally maintained in their lowermost positions, as illustrated, wherein seal ring 43A sealingly engages valve seat 22A and seal ring 44A is spaced downwardly from valve seat 24A. Thus, port 26A is isolated from the remaining ports, whereas load port 28A is in open communication with exhaust port 27A.

Figure 4:
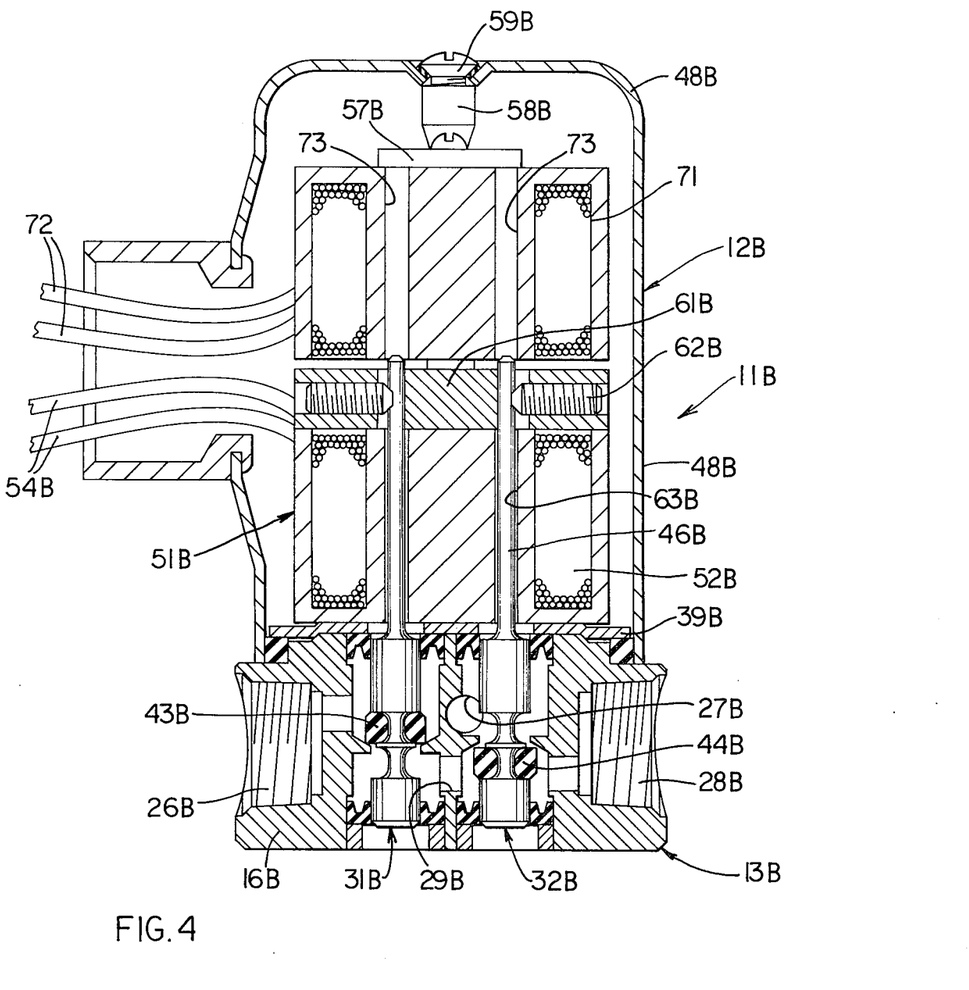
FIG. 4 is a sectional view similar to FIG. 1 and illustrating still a further modified valve assembly.

FIG. 4 illustrates a further variation of the invention and comprises a double solenoid-operated poppet valve assembly. The valve assembly 11B of FIG. 4 is also similar to the valve assembly 11 of FIGS. 1 and 2, and accordingly corresponding parts thereof have been designated by the same reference numeral but with a "B" added thereto.

The double solenoid-operated valve assembly 11B includes an upper electromagnet 71 which is supplied with electrical energy by further electrical leads 72, which electromagnet 71 has openings 73 therein aligned with the openings 63B in the lower electromagnet 52B for slidably accommodating the rod portions 46B. Upper electromagnet 71 is spaced from lower electromagnet 52B by intermediate spacer sleeves (not shown), and the electromagnets are fixed to the valve housing 16B by screws 68B.

In operation, when the lowermost electromagnet 52B is energized, the armature 61B is moved downwardly into the position illustrated in FIG. 4, whereupon seal ring 43B sealingly engages its valve seats so as to isolate the inlet port 26B, whereas seal ring 44B disengages its valve seat to allow open communication between port 27B and load port 28B.

On the other hand, when the upper electromagnet 71 is energized, then armature 61B is moved upwardly whereby seal ring 44B engages its valve seat and isolates exhaust port 27B from load port 28B. At the same time, seal ring 43B disengages its valve seats so that inlet port 26B is permitted to communicate with load port 28B.

In both of the FIGS. 3 and 4 forms, since the same valve assembly is used as in the FIGS. 1 and 2 forms, the valve rods remain balanced in all operating positions thereof with the resulting advantages above stated.

Figure 5:
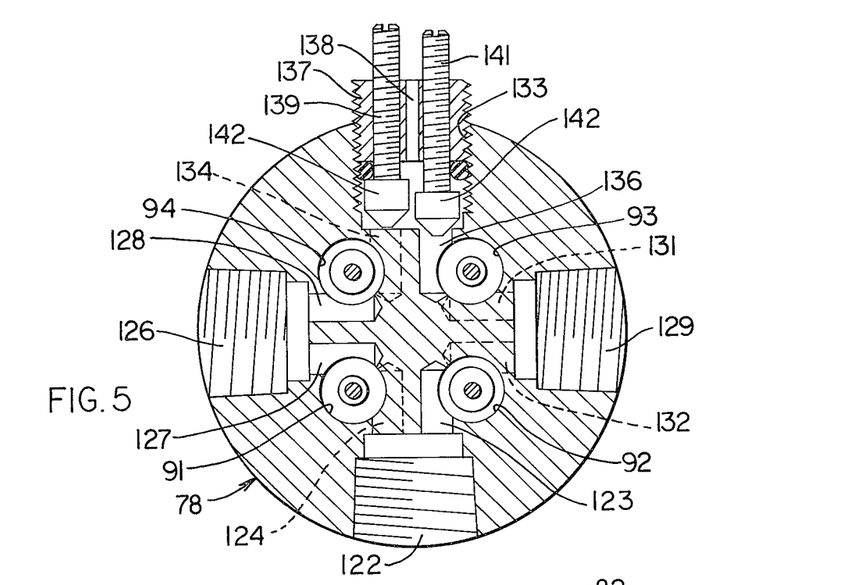
FIG. 5 is a sectional view of another embodiment of the invention using therein four poppet valve stems.
Figure 6:
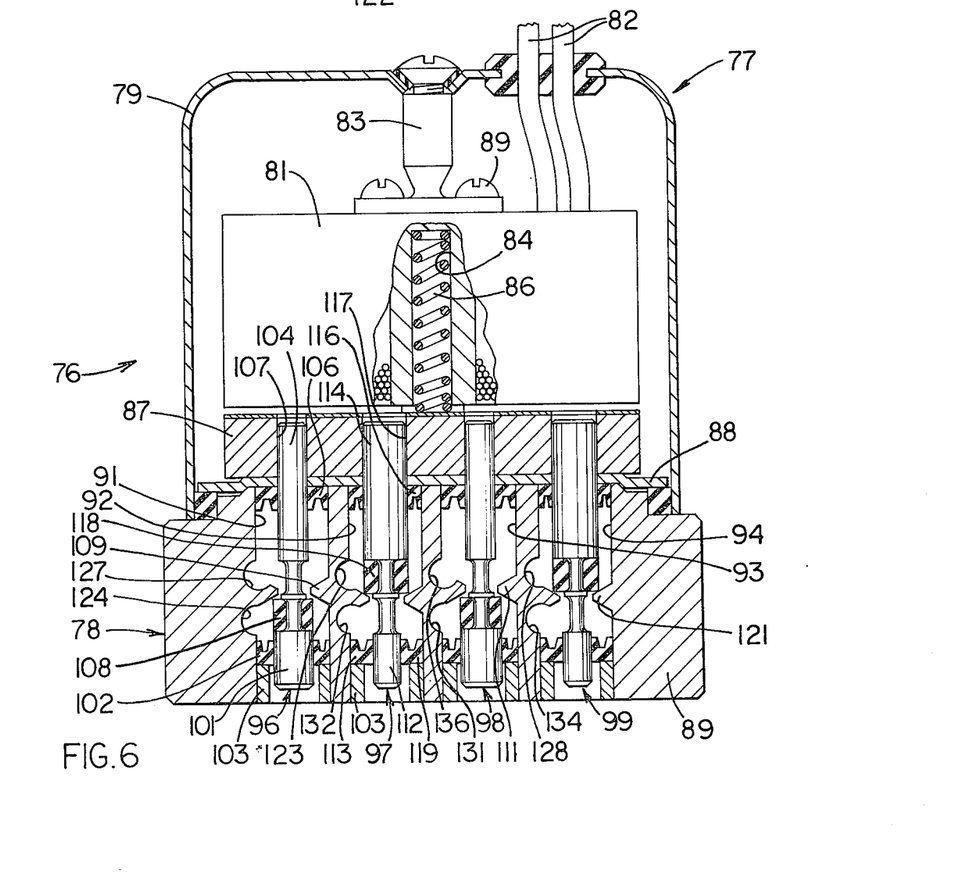
FIG. 6 is a sectional elevational view of the valve structure of FIG. 5 except that the four valve stems are positioned in adjacent relationship for purposes of illustration.

FIGS. 5 and 6 illustrate another embodiment of the invention which comprises a solenoid-operated four-way valve assembly 76 having an operator portion 77 and a valve portion 78. The operator portion 77 includes an electromagnet 81 supplied with electrical energy via leads 82 and connected by a connector 83 to the surrounding cup-shaped housing 79. Electromagnet 81, which is fixed to the valve housing 89 by screws 85, has a cylindrical opening 84 formed therein for confining a spring 86 which coacts with the disk-shaped armature 87 so as to resiliently urge same downwardly into engagement with a disk 88 which bears on the upper end of the valve housing 89.

The valve housing 89 includes cylindrical openings 91, 92, 93 and 94 extending therethrough in substantially parallel relationship, and valve stem assembly 96, 97, 98 and 99 are individually associated with the respective openings.

The valve stem assembly 96 includes a lower cylindrical portion 101 slidably and sealingly engaged with a resilient seal ring 102, which seal ring also engages the sidewall of the opening and is retained by a retainer ring 103. Valve stem assembly 96 also includes an upper cylindrical portion 104 which is of smaller diameter than portion 101 and is slidably and sealingly supported on a further seal ring 106 disposed in the upper end of the opening 91 and retained in position by the disk 88. The upper end of cylindrical portion 104 extends into an opening 107 formed in the armature 87 and is fixed to the armature, as by a set screw (not shown).

The cylindrical portions 101 and 107 are axially separated by a pair of axially spaced angular grooves formed on the valve stem, and the lowermost groove accommodates an elastomeric seal ring 108 which is positioned to sealingly engage a downwardly directed tapered valve seat as formed on an annular flange 109 which projects into the opening 91.

The poppet valve stem 98 as disposed within the opening 93 is identical to the poppet valve stem 96 and the seal ring thereof is again adapted for sealing engagement with a downwardly directed tapered valve seat as formed on an annular flange 111 which projects into the opening 93.

Considering now the valve stem assembly 97, same includes a lower cylindrical portion 112 which is slidably and sealingly engaged with a seal ring 113, the latter being held in the opening 92 by a retainer ring 103. The upper end of valve stem 97 has a further elongated cylindrical portion 114 associated therewith, which portion 114 is of larger diameter than portion 112 and is slidably and sealingly engaged with a further seal ring 116 located adjacent the upper end of the respective opening. The upper end of cylindrical portion 114 also extends into an opening 117 formed in the armature 87 and is fixedly connected to the armature, as by a set screw. The poppet valve assembly 97 also has a pair of annular grooves disposed in axially spaced relationship and positioned between the cylindrical portions 112 and 114, and the uppermost groove accommodates therein an elastomeric seal ring 118 which is positioned to sealingly engage an upwardly directed tapered valve seat as formed on the flange 119.

The valve assembly 99 is identical to the assembly 97 and again has an elastomeric seal ring thereon positioned to sealingly engage an upwardly directed valve seat as formed on the flange 121 associated with the opening 94.

The valve assembly 76 includes an inlet port 122 communicating with a pair of passages 123 and 124 which respectively communicate with the openings 92 and 91. The valve housing has a first load port 126 formed therein which communicates by means of connecting passages 127 and 128 to the openings 91 and 94, respectively. A second load port 129 is formed in the valve housing and communicates by means of passages 131 and 132 with the openings 93 and 92, respectively. An exhaust port 133 is also formed in the valve housing and communicates by the passages 134 and 136 with the openings 94 and 93, respectively. The exhaust port 133, in the illustrated embodiment, has a threaded plug 137 positioned therein, which plug has an exhaust opening 138 extending therethrough. The plug 137 supports thereon a pair of flow restricting devices 139 and 141, which restricting devices each comprise a threaded element having a conical nose portion 142 adapted to coact with one of the passages 134 and 136 to permit controlled and restricted flow therefrom.

All of the ports formed in the housing, as in the abovementioned embodiments, are of a conventional size to accommodate therein the threaded end of a conventional conduit, such as a ¼ NPT pipe.

In operation, the spring 86 normally maintains the valve assembly 76 in the position illustrated in FIG. 6 so that the pressurized gas supplied to inlet port 122 flows through the passage 124 and past the valve seat 109 so as to be supplied through passage 127 to the load port 126. The other inlet passage 123 is blocked by the seal ring 118 associated with the valve assembly 97 being engaged with the valve seat 119. At the same time, the other load port 129 is in open communication with exhaust port 133 by means of the connecting intermediate passages 131 and 136. The exhaust of pressure fluid from the load device connected to load port 129 can be suitably controlled or restricted by adjusting the restriction device 141 so as to restrict the discharge end of the passage 136.

When electrical operator 77 is energized, armature 87 is lifted upwardly and causes all of the valve stem assemblies to move upwardly, whereby the two valve assemblies 96 and 98 are moved into sealing engagement with their respective valve seats whereas the remaining valve stem assemblies 97 and 99 are disengaged from their respective valve seats. Thus, pressure fluid supplied to inlet port 122 flows through passages 123 and 132 so as to be supplied to the second load port 129. The first load port 126 is now in open communication with the discharge passage 134, and the discharge of air from passage 134 can be suitably controlled by adjusting the restricting device 139.

Thus, when using the valve assembly of FIGS. 5 and 6, the load ports 126 and 129 can be connected to separate load devices or can be connected to the opposite ends of a double-acting fluid pressure cylinder and, by suitably adjusting the restriction devices 139 and 141, the rate of exhaust of gas from the two load ports can be individually adjusted as desired.

Again, as in the previously described embodiments, the projection of the guide portions 101, 104, 112 and 114, and further portions corresponding thereto, past the respectively associated seals 102, 106, 113 and 116, and further seals corresponding thereto, insure against unbalance in the valve. This in turn assures reliable operation in all operating positions with a minimum of applied power and this reduces the size of the solenoid and hence reduces both the power demand of the valve and the size of the total assembly.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A poppet-type valve assembly, comprising:

valve housing means having a pair of opposite end surfaces and also having first and second substantially parallel openings extending therethrough from one end surface to the other end surface thereof;

said housing means including annular means defining first and second annular valve seats associated with said first and second openings respectively, said valve seats being positioned intermediate the opposite ends of the respective opening and disposed so as to surround the respective opening and project radially inwardly relatively thereto, said first valve seat facing toward said one end surface of said housing means and said second valve seat facing toward the other end surface of said housing means;

said first valve seat dividing said first opening into first and second annular chambers located adjacent said one end surface and said other end surface respectively, and said second valve seat dividing said second opening into first and second annular chambers located adjacent said one end surface and other end surface respectively;

said housing means having formed therein (1) an inlet port communicating directly with the first chamber of said first opening for permitting a pressure fluid to be supplied thereto, (2) an exhaust port communicating directly with said first chamber of said second opening for permitting pressure fluid to be discharged therefrom, (3) a load port communicating directly with one of said second chambers for permitting the flow of pressure fluid to or from an external load, and (4) an internal passage providing direct flow communication between the second chamber of said first opening and the second chamber of said second opening;

first and second poppet-valve plunger means movably positioned within said first and second openings, respectively, and being movable for sealingly engaging the respective valve seat, each said poppet-valve plunger means including an elongated valve stem having first and second cylindrical guide portions spaced axially from one another and positioned within the respective first and second chambers of the respective opening;

each said valve stem also having a first annular groove positioned axially adjacent the first cylindrical portion and a second annular groove positioned axially adjacent the second cylindrical portion, said first and second annular grooves being identical and disposed between said first and second cylindrical portions, said first and second grooves also being positioned axially adjacent one another and separated by a narrow annular flange which is fixed to the valve stem and projects radially outwardly thereof;

a first elastomeric seal ring fixedly associated with said first plunger means and disposed within said first annular groove, said first elastomeric seal ring being positioned within the first chamber of said first opening whereby it is movable into sealing engagement with said first valve seat, a second elastomeric seal ring fixedly associated with said second plunger means and being disposed within said second annular groove, said second elastomeric seal ring being disposed within the second chamber of said second opening and positioned for sealing engagement with said second valve seat, each said elastomeric seal ring having an external diameter of a magnitude similar to the diameter of the adjacent cylindrical guide portions associated with the respective plunger means;

first elastomeric seal ring means associated with each of said first and second openings and disposed adjacent said one end surface for creating a slidable sealed relationship between said housing means and the first cylindrical guide portions of said first and second plunger means;

second elastomeric seal ring means associated with each of said first and second openings and disposed adjacent the other end surface of said valve housing means for creating a slidable sealed relationship between said housing means and the second cylindrical guide portions of said first and second plunger means;

each of said valve stems including an elongated rod-like extension projecting axially beyond one of the cylindrical guide portions and projecting outwardly beyond one of the end surfaces of said housing means; and operator means coacting with said extensions for causing axial shifting movement of said valve plunger means, said operator means comprising solenoid means having an electromagnet fixed relative to said housing means and an armature which is movable relative to said housing means and said electromagnet, said armature being fixedly connected to said extensions whereby energization of said electromagnet causes movement of said armature which in turn causes a corresponding movement of said first and second valve plunger means.

2. A valve assembly according to claim 1, wherein said valve housing means comprises a cylindrical one-piece valve housing having said first and second openings extending axially therethrough, said first and second openings each being of substantially uniform diameter as they extend through said valve housing, each said valve seat comprising an annular flange which is fixedly and integrally connected to said valve housing and projects radially inwardly into the respective opening, each said valve seat defining a flow opening having a diameter substantially less than the diameter of said first and second openings, and each said valve stem being slidably and sealingly supported on the valve housing solely by said first and second elastomeric seal ring means.

3. A valve assembly according to claim 2, wherein said operator means includes a cup-shaped housing coaxially aligned with said cylindrical valve housing and having the free edge thereof connected to said cylindrical valve housing adjacent one axial end thereof, said electromagnet having a pair of openings extending axially thereof and aligned with similar openings in said armature, and the extensions on said valve stems projecting into the openings in said armature and said electromagnet.

4. A poppet-type valve assembly, comprising:

valve housing means having a pair of opposite end surfaces and also having first and second substantially parallel openings extending therethrough from one end surface to the other end surface thereof;

said housing means including annular means defining first and second annular valve seats associated with said first and second openings respectively, said valve seats being positioned intermediate the opposite ends of the respective opening and disposed so as to surround the respective opening and project radially inwardly relatively thereto, said first valve seat facing toward said one end surface of said housing means and said second valve seat facing toward the other end surface of said housing means;

said first valve seat dividing said first opening into first and second annular chambers located adjacent said one end surface and said other end surface respectively, and said second valve seat dividing said second opening into first and second annular chambers located adjacent said one end surface and said other end surface respectively;

said housing means having formed therein (1) an inlet port communicating directly with one of said chambers for permitting a pressure fluid to be supplied thereto, (2) an exhaust port communicating directly with a further one of said chambers for permitting pressure fluid to be discharged therefrom, and (3) a load port communicating directly with a still further one of said chambers for permitting the flow of pressure fluid to or from an external load;

first and second poppet-valve plunger means movably positioned within said first and second openings, respectively, and being movable for sealingly engaging the respective valve seat, each said poppet-valve plunger means including an elongated valve stem having first and second cylindrical guide portions spaced axially from one another and positioned within the respective first and second chambers of the respective opening;

each said valve stem also having a first annular groove positioned axially adjacent the first cylindrical portion and a second annular groove positioned axially adjacent the second cylindrical portion, said first and second annular grooves being identical and disposed between said first and second cylindrical portions, said first and second grooves also being positioned axially adjacent one another and separated by a narrow annular flange which is fixed to the valve stem and projects radially outwardly thereof;

a first elastomeric seal ring fixedly associated with said first plunger means and disposed within said first annular groove, said first elastomeric seal ring being positioned within the first chamber of said first opening whereby it is movable into sealing engagement with said first valve seat, a second elastomeric seal ring fixedly associated with said second plunger means and being disposed within said second annular groove, said second elastomeric seal ring being disposed within the second chamber of said second opening and positioned for sealing engagement with said second valve seat, each said elastomeric seal ring having an external diameter of a magnitude similar to the diameter of the adjacent cylindrical guide portions associated with the respective plunger means;

first elastomeric seal ring means associated with each of said first and second openings and disposed adjacent said one end surface for creating a slidable sealed relationship between said housing means and the first cylindrical guide portions of said first and second plunger means;

second elastomeric seal ring means associated with each of said first and second openings and disposed adjacent the other end surface of said valve housing means for creating a slidable sealed relationship between said housing means and the second cylindrical guide portions of said first and second plunger means;

each of said valve stems including an elongated rod-like extension projecting axially beyond one of the cylindrical guide portions and projecting outwardly beyond one of the end surfaces of said housing means; and operator means coacting with said extensions for causing axial shifting movement of said valve plunger means, said operator means comprising solenoid means having an electromagnet fixed relative to said housing means and an armature which is movable relative to said housing means and said electromagnet, said armature being fixedly connected to said extensions whereby energization of said electromagnet causes movement of said armature which in turn causes a corresponding movement of said first and second valve plunger means.

* * * * *